United States Patent
Nozawa et al.

(10) Patent No.: US 9,831,816 B2
(45) Date of Patent: Nov. 28, 2017

(54) SEMICONDUCTOR POWER MODULE AND DRIVE SYSTEM FOR ELECTRIC MOTOR

(71) Applicant: Renesas Electronics Corporation, Tokyo (JP)

(72) Inventors: Toshiya Nozawa, Tokyo (JP); Yoshitaro Kondo, Tokyo (JP); Yusuke Sugawara, Tokyo (JP); Shoichi Kamimura, Tokyo (JP); Masatoshi Maeda, Tokyo (JP); Yasuhiro Shirai, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/232,176

(22) Filed: Aug. 9, 2016

(65) Prior Publication Data
US 2017/0093325 A1    Mar. 30, 2017

(30) Foreign Application Priority Data
Sep. 25, 2015 (JP) ................. 2015-188194

(51) Int. Cl.
*H02P 1/04* (2006.01)
*H02P 3/00* (2006.01)
(Continued)

(52) U.S. Cl.
CPC .............. *H02P 29/68* (2016.02); *H02M 7/48* (2013.01); *H02P 29/027* (2013.01)

(58) Field of Classification Search
CPC .... B25F 5/00; B25F 5/02; B25F 5/008; H02J 2007/0098; H02J 7/0004; H02J 7/0042;
(Continued)

(56) References Cited

U.S. PATENT DOCUMENTS

| 6,268,986 B1* | 7/2001 | Kobayashi ......... H03K 17/0828 361/24 |
| 7,270,910 B2* | 9/2007 | Yahnker .................. B25F 5/008 30/500 |

(Continued)

FOREIGN PATENT DOCUMENTS

| JP | 2008-535255 A | 8/2008 |
| JP | 2015-068810 A | 4/2015 |

*Primary Examiner* — Paul Ip
(74) *Attorney, Agent, or Firm* — Mattingly & Malur, PC

(57) ABSTRACT

Erroneous mounting of a semiconductor power module can be more easily detected. A semiconductor power module (9) according to the present invention includes: a status signal generation unit (90) configured to detect a status in the semiconductor power module (9) and generate and output a status signal indicating the detected status; an identification information storage unit (91) configured to preliminarily store identification information for identifying the semiconductor power module (9) and output an identification signal indicating the identification information; and a switching unit (92) configured to select one of the status signal output from the status signal generation unit (90) and the identification signal output from the identification information storage unit (91) and output the selected signal to an outside of the semiconductor power module (9).

8 Claims, 4 Drawing Sheets

(51) Int. Cl.
*H01L 25/07* (2006.01)
*H02P 29/68* (2016.01)
*H02P 29/024* (2016.01)
*H02M 7/48* (2007.01)

(58) Field of Classification Search
CPC ...... H02J 7/0052; H02J 7/0063; H02J 7/0068; H02J 2007/0039; H02J 2007/0067; H02J 7/0029; H02J 7/0031; H02J 7/0065
USPC ............... 318/400.12, 400.14, 484; 320/114; 15/412
See application file for complete search history.

(56) References Cited

U.S. PATENT DOCUMENTS

| | | | | |
|---|---|---|---|---|
| 7,719,234 | B2* | 5/2010 | Carrier | B25F 5/00 320/112 |
| 7,723,952 | B2* | 5/2010 | Phillips | B25F 5/00 307/150 |
| 7,839,201 | B2 | 11/2010 | Jacobson | |
| 7,868,591 | B2* | 1/2011 | Phillips | B25F 5/00 307/150 |
| 7,973,511 | B2* | 7/2011 | Choksi | H02J 7/0008 320/106 |
| 8,319,475 | B2* | 11/2012 | Choksi | B25F 5/00 320/106 |
| 9,256,988 | B2* | 2/2016 | Wenger | B25F 5/00 |
| 2005/0073282 | A1* | 4/2005 | Carrier | B25F 5/00 320/106 |
| 2005/0202310 | A1* | 9/2005 | Yahnker | B25F 5/008 429/62 |
| 2006/0087283 | A1* | 4/2006 | Phillips | B25F 5/00 320/114 |
| 2006/0087284 | A1* | 4/2006 | Phillips | B25F 5/00 320/114 |
| 2006/0087285 | A1* | 4/2006 | Phillips | B25F 5/00 320/114 |
| 2006/0087286 | A1* | 4/2006 | Phillips | B25F 5/00 320/114 |
| 2007/0128505 | A9* | 6/2007 | Yahnker | B25F 5/008 429/62 |
| 2007/0252675 | A1* | 11/2007 | Lamar | B25F 5/00 340/5.64 |
| 2008/0185914 | A1* | 8/2008 | Randall | H02J 9/061 307/64 |
| 2008/0203995 | A1* | 8/2008 | Carrier | B25F 5/00 323/351 |
| 2010/0141207 | A1* | 6/2010 | Phillips | B25F 5/00 320/114 |
| 2010/0251509 | A1* | 10/2010 | Clothier | A47L 5/24 15/412 |
| 2010/0251510 | A1* | 10/2010 | Clothier | A47L 5/24 15/412 |
| 2010/0251511 | A1* | 10/2010 | Clothier | A47L 5/24 15/412 |
| 2010/0251512 | A1* | 10/2010 | Clothier | H02P 6/085 15/412 |
| 2010/0253250 | A1* | 10/2010 | Marvelly | H02P 6/085 318/3 |
| 2010/0253257 | A1* | 10/2010 | Clothier | H02P 23/0086 318/400.12 |
| 2010/0253261 | A1* | 10/2010 | Dawe | A47L 5/24 318/400.14 |
| 2010/0253262 | A1* | 10/2010 | Celik | A47L 5/26 318/400.14 |
| 2010/0253263 | A1* | 10/2010 | Clothier | A47L 5/26 318/400.14 |
| 2010/0253264 | A1* | 10/2010 | Clothier | A47L 5/24 318/400.14 |
| 2010/0253265 | A1* | 10/2010 | Clothier | A47L 5/26 318/400.14 |
| 2010/0253268 | A1* | 10/2010 | Marvelly | H02P 6/14 318/400.26 |
| 2010/0253274 | A1* | 10/2010 | Clothier | H02P 6/085 318/561 |
| 2010/0295492 | A1* | 11/2010 | Chakrabarti | B60L 3/0038 318/490 |
| 2014/0070924 | A1* | 3/2014 | Wenger | B25F 5/00 340/10.1 |
| 2014/0306628 | A1* | 10/2014 | Benson | H02P 29/02 318/400.17 |
| 2016/0151846 | A1* | 6/2016 | Suzuki | B25F 5/00 340/12.5 |
| 2016/0171788 | A1* | 6/2016 | Wenger | B25F 5/00 340/10.1 |

\* cited by examiner

SEMICONDUCTOR POWER MODULE AND DRIVE SYSTEM FOR ELECTRIC MOTOR

CROSS-REFERENCE TO RELATED APPLICATIONS

This application is based upon and claims the benefit of priority from Japanese patent application No. 2015-188194, filed on Sep. 25, 2015, the disclosure of which is incorporated herein in its entirety by reference.

BACKGROUND

The present invention relates to a semiconductor power module and a drive system for an electric motor. For example, the present invention relates to a semiconductor power module for driving an electric motor.

A power module is an example of semiconductor devices (for example, Japanese Unexamined Patent Application Publication No. 2015-68810 and Published Japanese Translation of PCT International Publication for Patent Application, No. 2008-535255). An intelligent power module (IPM) is known as a power module. The IPM incorporates a drive circuit for driving an electric motor based on a drive signal from an external device, and a protection circuit for protecting the IPM itself.

The power module is packaged, and various types of packages are produced. For example, various types of packages have different rated currents. Although there are various types of packages for power modules, many of the packages have the same shape. This may cause a problem that when a package for a power module is mounted on a printed wiring board in a production line, a package different from the package that is to be mounted on the printed wiring board is erroneously mounted on the printed wiring board.

For example, if an improper package with a rated current of 15 A is mounted on a product in which a package with a rated current of 15 A is to be mounted, the current necessary for the product can be supplied, so that the product operates as if the package were mounted thereon normally. However, in effect, the product operates in an overcurrent state, which may cause a failure in the product. For this reason, there is a demand for a mechanism capable of easily detecting erroneous mounting of a power module package.

As a method for detecting erroneous mounting, a method can be employed in which a label for identifying the type of a package is attached to the package and the label is visually checked by an operator in a production line. However, in this method, the size of the label is extremely small and the label may be hidden behind other implementation modules such as a radiator plate. Accordingly, there is a problem that it takes the operator a lot of time and effort.

SUMMARY

As described above, there is a problem that a semiconductor power module may be erroneously mounted.

Other problems to be solved by and novel features of the present invention will become apparent from the following description and the accompanying drawings.

According to one embodiment, a semiconductor power module includes a switching unit configured to select one of a status signal indicating a status in the semiconductor power module, and an identification signal for identifying the semiconductor power module, and output the selected signal to an outside of the semiconductor power module.

According to the one embodiment, erroneous mounting of a semiconductor power module can be more easily detected.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Preferable embodiments will be described below with reference to the drawings. Specific numerical values described in the following embodiments are merely exemplary to facilitate understanding of the embodiments, and are not limited to these unless specified in particular. Further, matters which are obvious to one of ordinary skill in the art will be optionally omitted and simplified for clarification of the description.

First Embodiment

Figure 1:
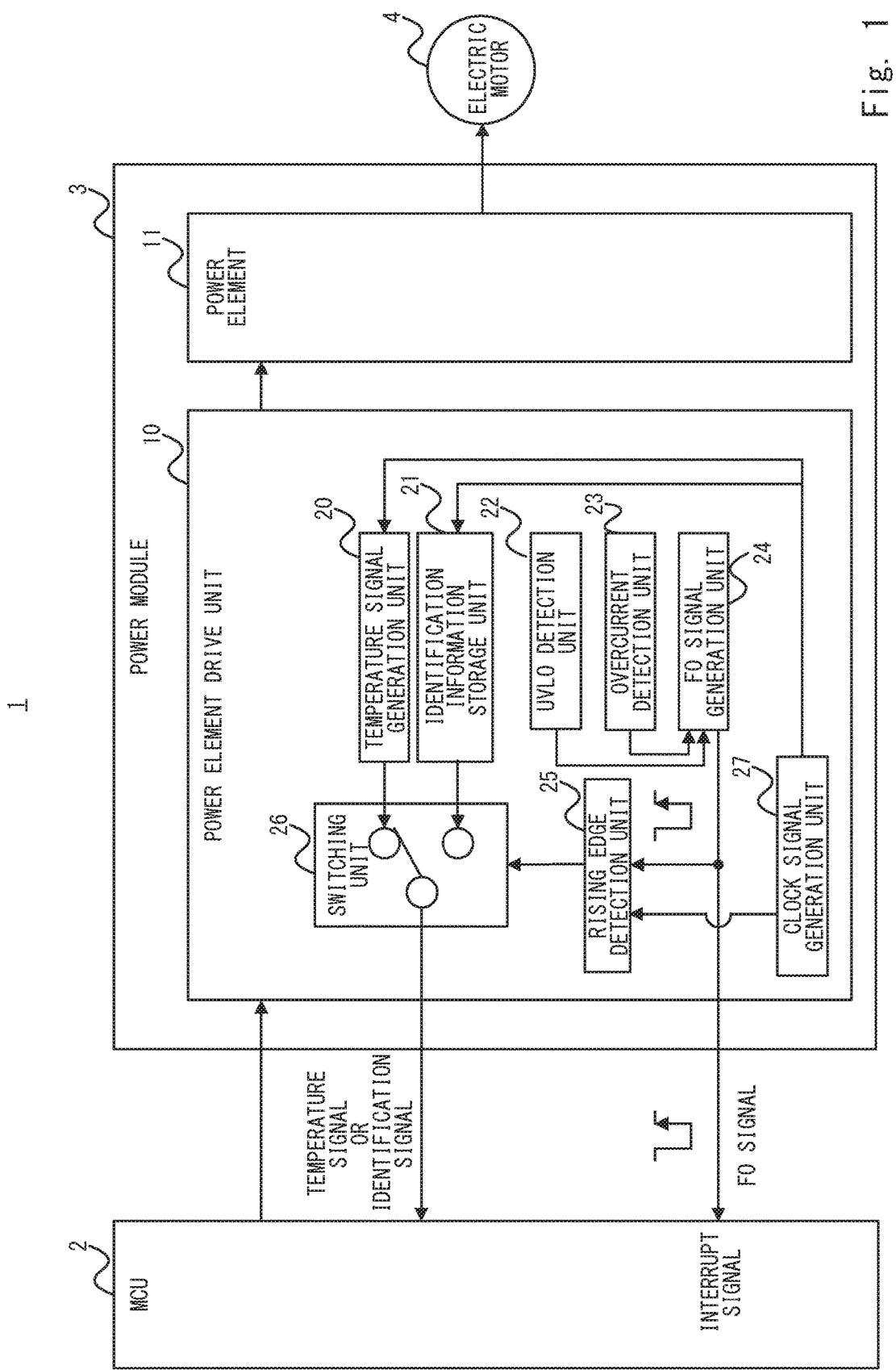
FIG. 1 is a block diagram showing an electric motor drive system according to a first embodiment.

Referring first to FIG. 1, a configuration of an electric motor drive system 1 according to a first embodiment will be described. As shown in FIG. 1, the electric motor drive system 1 includes a micro control unit (MCU) 2, a power module 3, and an electric motor 4.

The MCU 2 (power module control unit) is a semiconductor device that controls the power module 3 to drive the electric motor 4. Specifically, the MCU 2 outputs, to the power module 3, a drive signal indicating driving of the electric motor 4, thereby driving the electric motor 4. The drive signal is, for example, a pulse width modulation (PWM) signal indicating supply of a current to the electric motor 4, or interruption of the supply. In the PWM signal, an interval in which the pulse is high corresponds to an interval in which an instruction to supply a current to the electric motor 4 is given, and an interval in which the pulse is low corresponds to an interval in which an instruction to interrupt the supply of a current to the electric motor 4 is given.

The power module 3 is a semiconductor device that drives the electric motor 4 according to the control from the MCU 2. As shown in FIG. 1, the power module 3 includes a power element drive unit 10 and a power element 11. The power module 3 is, for example, a semiconductor package in which a semiconductor chip including the power element drive unit 10 and a semiconductor chip including the power element 11 are packaged.

The power element drive unit 10 (control unit) is a circuit that controls the power element 11 to operate in the manner indicated by the drive signal output from the MCU 2, thereby driving the electric motor 4. The power element drive unit 10 is, for example, a high voltage IC (HVIC). The power element 11 supplies a current to the electric motor 4 according to the control from the power element drive unit 10, thereby driving the electric motor 4. The power element 11 is, for example, a switching element such as a power transistor. The power transistor is, for example, an insulated gate bipolar transistor (IGBT).

Specifically, during a period in which the PWM signal output from the MCU 2 as the drive signal is high, the power element drive unit 10 turns on the power element 11 to supply a current to the electric motor 4. During a period in which the PWM signal output from the MCU 2 as the drive signal is low, the power element drive unit 10 turns off the power element 11 to interrupt the supply of the current to the electric motor 4.

The electric motor 4 is a so-called motor. The electric motor 4 is rotated based on the current supplied from the power module 3. As described above, during the period in which the PWM signal from the MCU 2 is high, the power module 3 supplies the current to the electric motor 4. Accordingly, the rotational speed of the electric motor 4 increases in accordance with an increase in ratio (so-called duty ratio) of the period in which the pulse is high with respect to the pulse period in the PWM signal.

The power element drive unit 10 includes a temperature signal generation unit 20, an identification information storage unit 21, a UVLO (Under Voltage Lock Out) detection unit 22, an overcurrent detection unit 23, an FO signal generation unit 24, a rising edge detection unit 25, a switching unit 26, and a clock signal generation unit 27.

The temperature signal generation unit 20 is a circuit that measures a temperature within the power module 3, and generates a temperature signal indicating the measured temperature. The temperature signal generation unit 20 outputs the generated temperature signal to the switching unit 26.

The identification information storage unit 21 is a circuit that stores identification information uniquely indicating the type of the power module 3. The identification information is, for example, information indicating the product number of the power module 3 and the version of the power module 3. The identification information storage unit 21 outputs the identification information stored therein to the switching unit 26 as the identification signal.

The UVLO detection unit 22 determines whether or not the voltage supplied to the power module 3 is equal to or greater than a predetermined voltage threshold, generates a UVLO signal indicating the determination result, and outputs the UVLO signal to the inside of the power element drive unit 10. The UVLO signal is input to the FO signal generation unit 24.

The voltage threshold is a predetermined value as a minimum voltage necessary for a normal operation of the power module 3. Specifically, when the voltage supplied to the power module 3 is equal to or greater than the voltage threshold, the normal operation of the power module 3 is guaranteed. On the other hand, when the voltage supplied to the power module 3 is less than the voltage threshold, the normal operation of the power module 3 is not guaranteed.

In the first embodiment, an example will be described in which the UVLO signal indicating that the voltage supplied to the power module 3 is equal to or greater than the voltage threshold is low and the UVLO signal indicating that the voltage supplied to the power module 3 is less than the voltage threshold is high.

The overcurrent detection unit 23 is a circuit that detects an overcurrent in the power module 3. The overcurrent detection unit 23 determines whether or not the current supplied to the power module 3 is equal to or more than a predetermined current threshold, generates an overcurrent detection signal indicating the determination result, and outputs the overcurrent detection signal to the FO signal generation unit.

The current threshold is a predetermined value which is determined assuming that a current equal to or greater than the current threshold is determined to be an overcurrent. Specifically, when the current supplied to the power module 3 is less than the current threshold, the normal operation of the power module 3 is guaranteed. On the other hand, when the current supplied to the power module 3 is equal to or greater than the current threshold, the normal operation of the power module 3 is not guaranteed.

The FO (Fault Output) signal generation unit 24 is a circuit that generates an FO signal indicating whether or not the power module 3 is abnormal, and outputs the generated FO signal to the rising edge detection unit 25 and the MCU 2 via a detection terminal included in the power element drive unit 10.

When the UVLO signal output from the UVLO detection unit 22 indicates that the voltage supplied to the power module 3 is less than the voltage threshold, or when the overcurrent detection signal output from the overcurrent detection unit 23 indicates that the current supplied to the power module 3 is equal to or greater than the current threshold, the FO signal generation unit 24 generates the FO signal indicating that the power module 3 is abnormal. On the other hand, when the UVLO signal output from the UVLO detection unit 22 indicates that the voltage supplied to the power module 3 is equal to or greater than the voltage threshold and when the overcurrent detection signal output from the overcurrent detection unit 23 indicates that the current supplied to the power module 3 is less than the current threshold, the FO signal generation unit 24 generates the FO signal indicating that the power module 3 is normal.

In the first embodiment, an example in which the FO signal indicating that the power module 3 is normal is high and the FO signal indicating that the power module 3 is abnormal is low will be described below.

The rising edge detection unit 25 is a circuit that detects a rising edge of the FO signal at which the FO signal output from the FO signal generation unit 24 changes from a low level to a high level, and controls switching of the signal selected by the switching unit 26. More specifically, the rising edge detection unit 25 outputs, to the switching unit 26, an indication signal indicating selection of the identification signal from the identification information storage unit 21 during a predetermined period after a rising edge of the FO signal is detected. After a lapse of the predetermined period, the rising edge detection unit 25 outputs, to the switching unit 26, the indication signal indicating selection of the temperature signal from the temperature signal generation unit 20.

The switching unit 26 selects one of the temperature signal output from the temperature signal generation unit 20 and the identification signal output from the identification information storage unit 21 according to the control from the rising edge detection unit 25, and outputs the selected signal to the MCU 2 via a detection terminal included in the power element drive unit 10. More specifically, during a period in which the indication signal indicating selection of the temperature signal from the temperature signal generation unit 20 is output from the rising edge detection unit 25, the switching unit 26 selects the temperature signal from the temperature signal generation unit 20 and outputs the temperature signal to the MCU 2. On the other hand, during a period in which the indication signal indicating selection of the identification signal from the identification information storage unit 21 is output from the rising edge detection unit 25, the switching unit 26 selects the identification signal from the identification information storage unit 21 and outputs the identification signal to the MCU 2. The detection terminal (first detection terminal) from which the identification signal or the temperature signal is output is a detection terminal different from the detection terminal (second detection terminal) from which the FO signal is output.

The clock signal generation unit 27 is a circuit that generates a clock signal and supplies the clock signal to each of the circuits 20 to 26 in the power element drive unit 10. Each of the circuits 20, 21, and 25 included in the power element drive unit 10 operates based on the clock signal supplied from the clock signal generation unit 27.

With the configuration as described above, the power module 3 outputs the identification signal to the MCU 2 during a predetermined period after a rising edge of the FO signal is detected and the power module 3 is restored to a normal operational state, and the power module 3 outputs the temperature signal to the MCU 2 after a lapse of the predetermined period.

Accordingly, the MCU 2 can acquire, as the identification signal, the signal output from the power module 3 during the predetermined period after a rising edge of the FO signal is detected. The MCU 2 can execute processing for facilitating the detection of erroneous mounting of the power module 3 based on the acquired identification signal.

For example, the MCU 2 can display the content indicated by the identification signal on a display device of a personal computer (PC) (not shown) which is connected to the MCU 2. The MCU 2 and the PC can be connected via a wire. The MCU 2 transmits the identification signal, which is acquired from the power module 3, to the PC via the wire by serial communication. The serial communication is, for example, communication using a UART (Universal Asynchronous Receiver Transmitter). The PC displays the content indicated by the identification signal transmitted from the MCU 2 on the display device connected to the PC. A function for executing the operation of displaying the content indicated by the identification signal as described above may be implemented on the MCU 2 as an operation mode to be executed during an inspection process in a production line. The display device is, for example, a liquid crystal display, an organic EL display, or a plasma display.

According to this configuration, the type of the power module 3 can be easily confirmed by checking, by an operator, the content displayed on the display device. In other words, erroneous mounting of the power module can be easily checked. Thus, erroneous mounting of the power module can be easily checked even after the product is assembled.

When the signal output from the power module 3 during the predetermined period after a rising edge of the FO signal is detected is not the identification signal, the MCU 2 may inhibit the control of the power module 3, or may inhibit the operation of the MCU 2 itself. For example, when the value indicated by the signal acquired from the power module 3 is not a value which the identification signal can take, the MCU 2 inhibits the control of the power module 3, or inhibits the operation of the MCU 2 itself.

According to this configuration, measures against counterfeit products after shipment of the products can be taken. For example, if the power module 3 is loaded into a counterfeit product after shipment of the product, the use of the product can be inhibited.

After a lapse of the predetermined period after a rising edge of the FO signal is detected, the MCU 2 acquires the signal output from the power module 3 as the temperature signal. Further, the MCU 2 changes the content indicated by the drive signal according to the temperature indicated by the acquired temperature signal. For example, when the temperature of the power module 3 is high, it is necessary to suppress a temperature rise by reducing the amount of current to be supplied from the power element 11 to the electric motor 4. Accordingly, the MCU 2 performs a feedback control in such a manner that, as the temperature indicated by the temperature signal increases, the duty ratio of the PWM signal output as the drive signal is decreased and the amount of current to be supplied from the power element 11 to the electric motor 4 is decreased.

In this case, when the FO signal output from the power module 3 indicates that the power module 3 is abnormal, the MCU 2 stops the control for driving the electric motor 4. On the other hand, when the FO signal output from the power module 3 indicates that the power module 3 is normal, the MCU 2 performs the control for driving the electric motor 4.

More specifically, when the FO signal output from the power module 3 indicates that the power module 3 is abnormal, the MCU 2 changes the content indicated by the drive signal to stop the driving of the electric motor 4. In other words, the MCU 2 maintains the PWM signal, which is output as the drive signal, at the low level.

Figure 2:
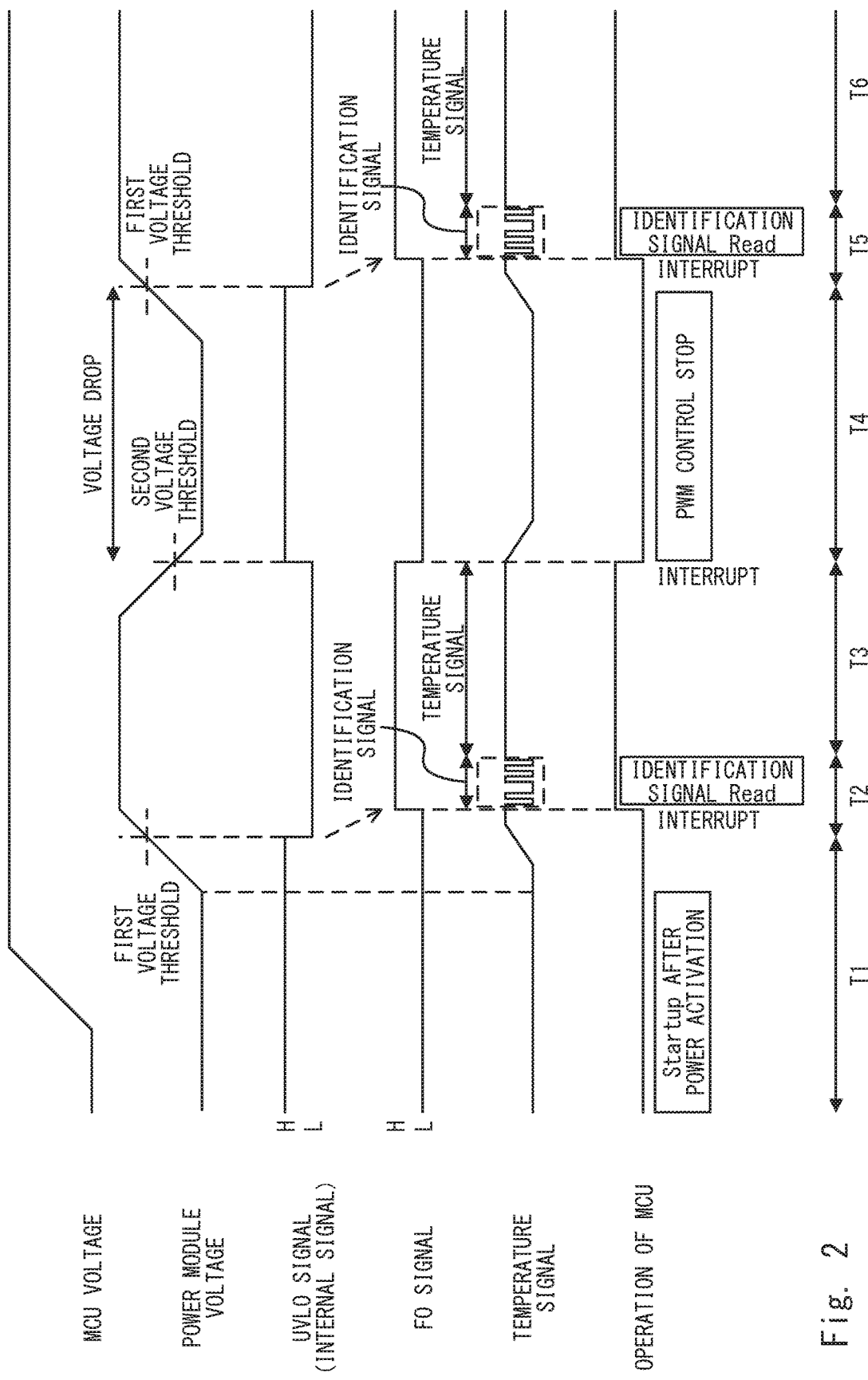
FIG. 2 is a timing diagram showing an operation of the electric motor drive system according to the first embodiment.

Referring next to FIG. 2, an operation of the electric motor drive system 1 according to the first embodiment will be described.

Period T1:

The electric motor drive system 1 is powered on to start the supply of a voltage to each of the MCU 2 and the power module 3. The voltage supplied to each of the MCU 2 and the power module 3 gradually increases, so that the MCU 2 and the power module 3 are started.

Period T2:

When the voltage supplied to the power module 3 is equal to or greater than a first voltage threshold, the UVLO detection unit 22 outputs, to the FO signal generation unit 24, the UVLO signal indicating that the voltage supplied to the power module 3 is equal to or greater than the voltage threshold. Specifically, the UVLO detection unit 22 sets the UVLO signal to the low level and outputs the UVLO signal to the FO signal generation unit 24. The FO signal generation unit 24 sets the FO signal to the high level according to the output of the low-level FO signal from the UVLO detection unit 22, and outputs the FO signal to the rising edge detection unit 25 and the MCU 2.

Accordingly, the rising edge detection unit 25 detects a rising edge of the FO signal output from the FO signal generation unit 24. Therefore, during the predetermined period after a rising edge of the FO signal is detected, the rising edge detection unit 25 outputs, to the switching unit 26, the indication signal indicating selection of the identification signal from the identification information storage unit 21. Thus, during the predetermined period, the switching unit 26 selects the identification signal, which is one of the signals, i.e., the temperature signal from the temperature signal generation unit 20 and the identification signal from the identification information storage unit 21, and outputs the identification signal to the identification signal MCU 2.

Further, the MCU 2 detects a rising edge of the FO signal, which is output from the FO signal generation unit 24, as an interrupt signal. The MCU 2 acquires, as a signal indicating the identification information about the power module 3, a signal output from the switching unit 26 during the predetermined period after the interrupt signal corresponding to the rising edge of the FO signal is detected.

Upon detecting the interrupt signal corresponding to the rising edge of the FO signal, the MCU 2 starts to drive the electric motor 4. Specifically, the MCU 2 changes the PWM signal output as the drive signal from a status in which the low level is maintained to a status in which a pulse is formed.

Period T3:

The rising edge detection unit 25 outputs the indication signal indicating selection of the temperature signal from the temperature signal generation unit 20 to the switching unit 26 after a lapse of the predetermined period after a rising edge of the FO signal is detected. Accordingly, after a lapse of the predetermined period, the switching unit 26 selects the temperature signal, which is one of the signals, i.e., the temperature signal from the temperature signal generation unit 20 and the identification signal from the identification information storage unit 21, and outputs the temperature signal to the MCU 2.

After a lapse of the predetermined period after the interrupt signal corresponding to the rising edge of the FO signal is detected, the MCU 2 acquires the signal output from the switching unit 26 as the temperature signal indicating the temperature of the power module 3. In other words, the MCU 2 performs a feedback control of the electric motor 4 based on the temperature indicated by the temperature signal.

Period T4:

Assume herein that some fault has occurred in the power supply system of the electric motor drive system 1 and the voltage supplied to the power module 3 has dropped. When the voltage supplied to the power module 3 is less than a second voltage threshold, the UVLO detection unit 22 outputs, to the FO signal generation unit 24, the UVLO signal indicating that the voltage of the power module 3 is less than the voltage threshold. In other words, the UVLO detection unit 22 sets the UVLO signal to the high level and outputs the UVLO signal to the FO signal generation unit 24. The FO signal generation unit 24 sets the FO signal to the low level according to the output of the high-level FO signal from the UVLO detection unit 22, and outputs the FO signal to the rising edge detection unit 25 and the MCU 2.

As described above, in this case, a value for determining whether or not the voltage supplied to the power module 3 is changed from a voltage less than the voltage threshold to a voltage equal to or greater than the voltage threshold and a value for determining whether or not the voltage supplied to the power module 3 is changed from a voltage equal to or greater than the voltage threshold to a voltage less than the voltage threshold may be provided separately as the voltage threshold. FIG. 2 shows an example in which the first voltage threshold is lower than the second voltage threshold. A common value may be provided for the value for determining whether or not the voltage supplied to the power module 3 is changed from a voltage less than the voltage threshold to a voltage equal to or greater than the voltage threshold and the value for determining whether or not the voltage supplied to the power module 3 is changed from a voltage equal to or greater than the voltage threshold to a voltage less than the voltage threshold.

The MCU 2 detects, as the interrupt signal, a falling edge of the FO signal output from the FO signal generation unit 24. When the interrupt signal indicating a falling edge of the FO signal is detected, the MCU 2 stops the driving of the electric motor 4. Specifically, the MCU 2 changes the PWM signal to be output as the drive signal from the status in which a pulse is formed to the status in which the low level is maintained.

Period T5:

Assume herein that the fault which occurred in the power supply system of the electric motor drive system 1 has been resolved and the voltage supplied to the power module 3 has been restored to a normal voltage. When the voltage supplied to the power module 3 is equal to or greater than the first voltage threshold, the UVLO detection unit 22 outputs, to the FO signal generation unit 24, the UVLO signal indicating that the voltage supplied to the power module 3 is equal to or greater than the voltage threshold. Specifically, the UVLO detection unit 22 sets the UVLO signal to the low level and outputs the UVLO signal to the FO signal generation unit 24. The FO signal generation unit 24 sets the FO signal to the high level according to the output of the low-level FO signal from the UVLO detection unit 22, and outputs the FO signal to the rising edge detection unit 25 and the MCU 2.

Accordingly, in the same manner as described above regarding the period T2, the rising edge detection unit 25 outputs, to the switching unit 26, the indication signal indicating selection of the identification signal from the identification information storage unit 21 during the predetermined period after a rising edge of the FO signal is detected. Also, the switching unit 26 selects the identification signal and outputs the identification signal to the MCU 2 during the predetermined period, in the same manner as described above regarding the period T2.

In the same manner as described above regarding the period T2, the MCU 2 acquires the signal output from the switching unit 26 as the signal indicating the identification information about the power module 3 during the predetermined period after the interrupt signal corresponding to the rising edge of the FO signal is detected. When the interrupt signal corresponding to the rising edge of the FO signal is detected, the MCU 2 changes the content indicated by the drive signal to start driving of the electric motor 4.

Period T6:

In the same manner as described above regarding the period T3, after a lapse of the predetermined period after a rising edge of the FO signal is detected, the rising edge detection unit 25 outputs, to the switching unit 26, the indication signal indicating selection of the temperature signal from the temperature signal generation unit 20. Also, the switching unit 26 selects the temperature signal and outputs the temperature signal to the MCU 2 after a lapse of the predetermined period, in the same manner as described above regarding the period T3.

In the same manner as described above regarding the period T3, after a lapse of the predetermined period after the interrupt signal is detected, the MCU 2 acquires the signal output from the switching unit 26 as the temperature signal indicating the temperature of the power module 3. In other words, the MCU 2 performs a feedback control of the electric motor 4 based on the temperature indicated by the temperature signal.

As described above, in the first embodiment, the power module 3 includes a status signal generation unit (corresponding to the temperature signal generation unit 20), the identification information storage unit 21, and the switching unit 26. The status signal generation unit detects a status (for example, a temperature) in the power module 3, generates a status signal (temperature signal) indicating the detected status, and outputs the status signal. The identification information storage unit 21 preliminarily stores the identification information for identifying the power module 3, and outputs the identification signal indicating the identification information. One of the status signal output from the status signal generation unit and the identification signal output from the identification information storage unit 21 is selected, and the selected signal is output to the outside of the power module 3.

According to this configuration, the identification signal indicating the identification information for identifying the power module 3 can be acquired from the power module 3, instead of the status signal, at a desired timing. Accordingly, whether or not the power module 3 is a desired power module can be easily recognized based on the identification signal. For example, the identification information indicated by the identification signal is displayed on the display device so that the operator can easily recognize whether or not the power module 3 is a desired power module. Consequently, erroneous mounting of the power module can be more easily detected.

Further, as described above, in the first embodiment, the power module 3 includes the FO signal generation unit 24 that generates a fault output signal indicating whether or not the power module 3 is abnormal, and outputs the fault output signal to the outside of the power module 3, and the rising edge detection unit 25 that detects that the FO signal (fault output signal) output from the FO signal generation unit 24 has been switched from the status indicating that the power module 3 is abnormal to the status indicating that the power module 3 is normal. The rising edge detection unit 25 outputs, to the switching unit 26, the indication signal indicating selection of the identification signal during a predetermined period after the detection that the FO signal has been switched from the status indicating that the power module 3 is abnormal to the status indicating that the power module 3 is normal. The switching unit 26 selects the identification signal during the period in which the indication signal is output from the rising edge detection unit 25 as the predetermined period after the semiconductor power module is restored to the normal operational state.

According to this configuration, a function for facilitating the detection of erroneous mounting as described above can be added only by additionally mounting the identification information storage unit 21, the rising edge detection unit 25, and the switching unit 26 on the power module including a function for generating and outputting the status signal (for example, a temperature signal) and a function for generating and outputting the FO signal, without changing the configuration thereof.

Second Embodiment

Figure 3:
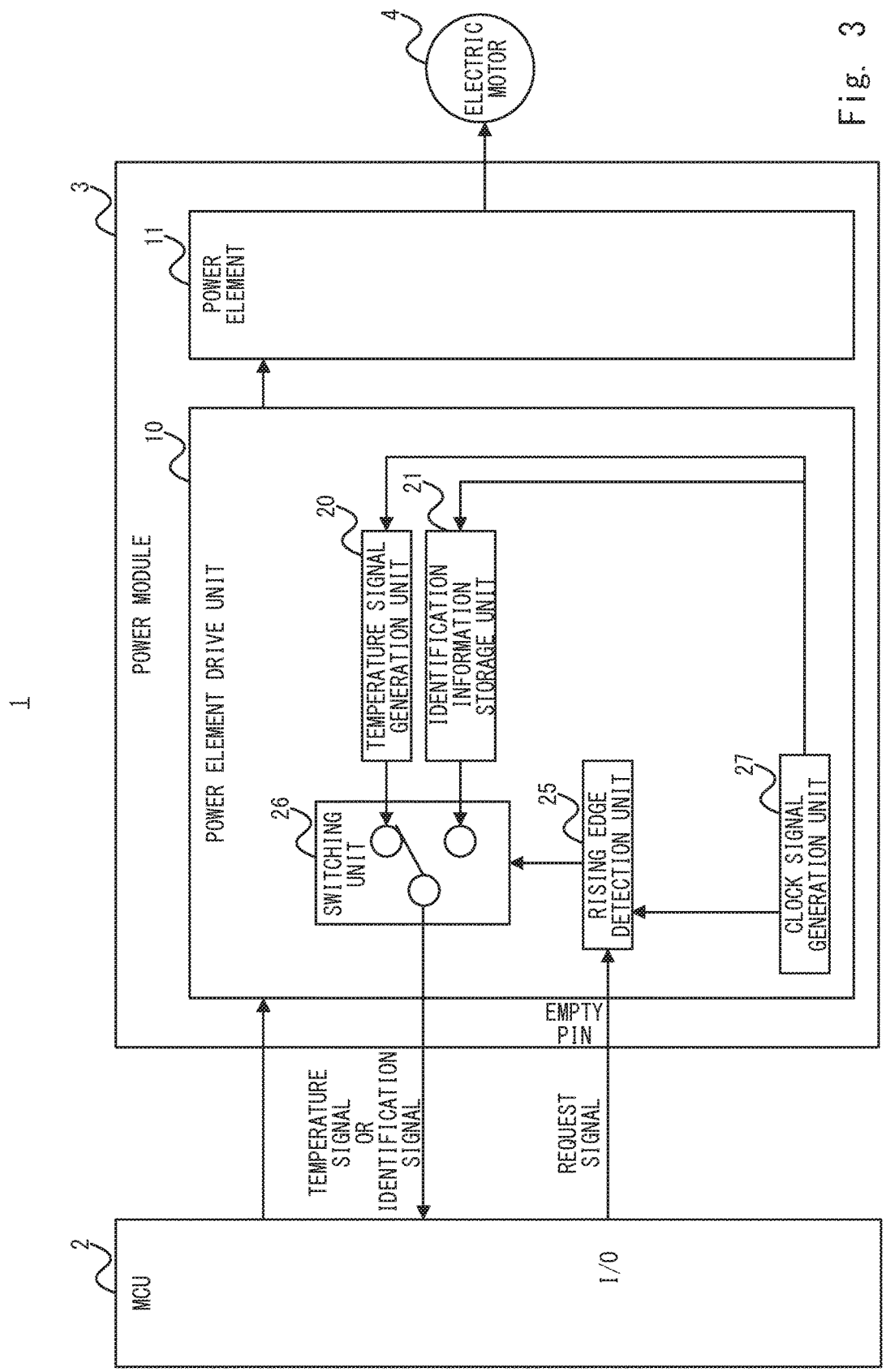
FIG. 3 is a block diagram showing an electric motor drive system according to a second embodiment.

Next, a second embodiment will be described. Referring to FIG. 3, the configuration of the electric motor drive system 1 according to the second embodiment will be described. As shown in FIG. 3, the electric motor drive system 1 according to the second embodiment differs from the electric motor drive system 1 according to the first embodiment shown in FIG. 1 in that the electric motor drive system 1 according to the second embodiment does not include the UVLO detection unit 22, the overcurrent detection unit 23, and the FO signal generation unit 24. Further, the rising edge detection unit 25 receives a request signal from the MCU 2, instead of the FO signal from the FO signal generation unit 24.

In the electric motor drive system 1 according to the second embodiment, the MCU 2 outputs, to the rising edge detection unit 25, the request signal indicating whether or not to request output of the identification information. More specifically, the MCU 2 outputs a high signal as the request signal requesting output of the identification information. On the other hand, the MCU 2 outputs a low signal as the request signal which does not request output of the identification information.

After a lapse of a predetermined period after the electric motor drive system 1 (the MCU 2 and the power module 3) is powered on and the startup of the MCU 2 is completed to start the operation, the MCU 2 outputs the request signal requesting output of the identification information to the rising edge detection unit 25. The predetermined period is determined in such a manner that a timing when the request signal requesting output of the identification information as described above is output to the rising edge detection unit 25 corresponds to a timing after a lapse of a predetermined period determined as a period required from a time when the electric motor drive system 1 (the MCU 2 and the power module 3) is powered on to a time when the voltage supplied to the power module 3 is stabilized and the power module 3 is restored to the normal operational state.

Thus, the rising edge detection unit 25 detects a rising edge of the request signal output from the MCU 2. Accordingly, the rising edge detection unit 25 outputs, to the switching unit 26, the indication signal indicating selection of the identification signal from the identification information storage unit 21 during a predetermined period after the rising edge of the request signal is detected. Therefore, during the predetermined period, the switching unit 26 selects the identification signal, which is one of the signals, i.e., the temperature signal from the temperature signal generation unit 20 and the identification signal from the identification information storage unit 21, and outputs the identification signal to the MCU 2.

The MCU 2 acquires, as the signal indicating the identification information about the power module 3, the signal output from the switching unit 26 during the predetermined period after the output of the request signal requesting output of the identification information is started.

After a lapse of the predetermined period after a rising edge of the request signal is detected, the rising edge detection unit 25 outputs, to the switching unit 26, the indication signal indicating selection of the temperature signal from the temperature signal generation unit 20. Accordingly, after a lapse of the predetermined period, the switching unit 26 selects the temperature signal, which is one of the signals, i.e., the temperature signal from the temperature signal generation unit 20 and the identification signal from the identification information storage unit 21, and outputs the temperature signal to the MCU 2.

After a lapse of the predetermined period after the output of the request signal requesting output of the identification information is started, the MCU 2 acquires the signal output from the switching unit 26 as the temperature signal indicating the temperature of the power module 3.

As described above, in the second embodiment, the power module 3 includes the rising edge detection unit 25 that detects the request signal received from an external circuit (MCU 2) after a lapse of the predetermined time determined as a period required from the time when the power module 3 is powered on to the time when the voltage of the power module 3 is stabilized. During a predetermined period after the request signal from the external circuit is detected, the rising edge detection unit 25 outputs, to the switching unit 26, the indication signal indicating selection of the identification signal. The switching unit 26 selects the identification signal during the period in which the indication signal is output from the rising edge detection unit 25 as the predetermined period after the power module 3 is restored to the normal operational state.

According to this configuration, even the power module having no function for generating and outputting the FO signal can be additionally provided with the function for facilitating the detection of erroneous mounting. The MCU 2 may output the request signal at any timing when the identification signal is to be acquired, and may acquire the identification signal only once at the timing. Thus, the processing load of the MCU 2 can be reduced.

Outline of Embodiments

Figure 4:
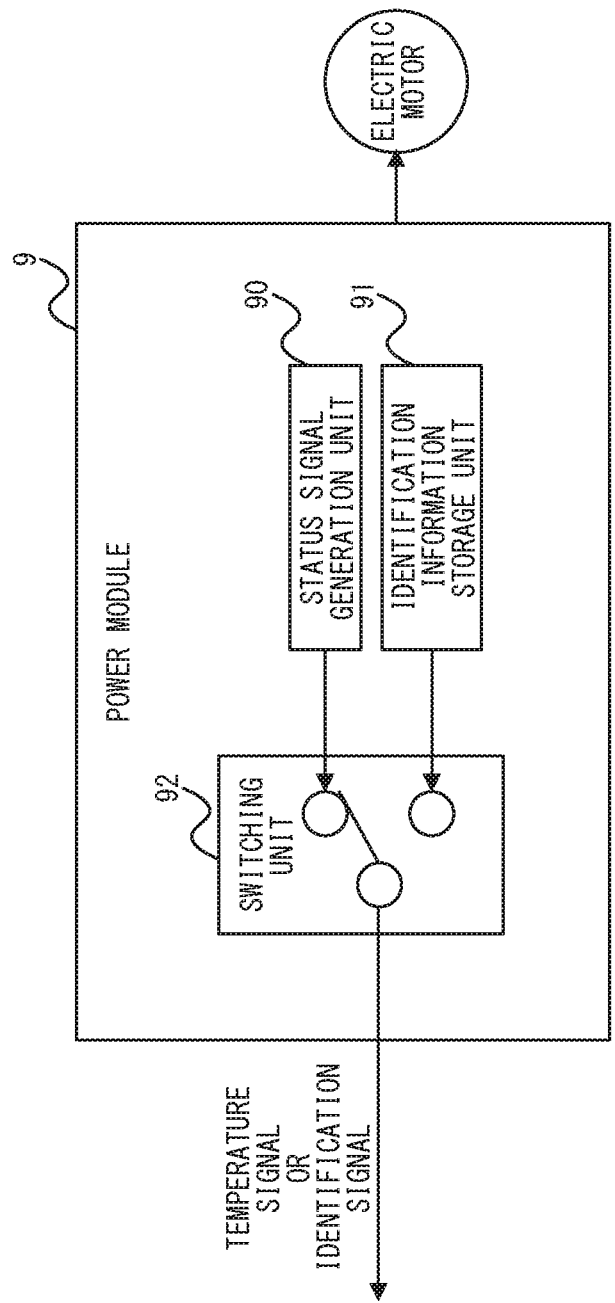
FIG. 4 is a schematic block diagram showing a power module according to an embodiment.

Referring now to FIG. 4, the configuration of a semiconductor power module 9 that is a schematic configuration of the power module 3 according to the first and second embodiments will be described below. As shown in FIG. 4, the semiconductor power module 9 includes a status signal generation unit 90, an identification information storage unit 91, and a switching unit 92.

The status signal generation unit 90 detects a status in the semiconductor power module 9, generates a status signal indicating the detected status, and outputs the status signal. The status signal generation unit 90 corresponds to the temperature signal generation unit 20.

The identification information storage unit 91 preliminarily stores identification information for identifying the semiconductor power module. The identification information storage unit 91 outputs an identification signal indicating the identification information. The identification information storage unit 91 corresponds to the identification information storage unit 21.

The switching unit 92 selects one of the status signal output from the status signal generation unit 90 and the identification signal output from the identification information storage unit 91, and outputs the selected signal to the outside of the semiconductor power module 9. The switching unit 92 corresponds to the switching unit 26.

According to this configuration, the identification signal indicating the identification information for identifying the semiconductor power module 9 can be acquired from the semiconductor power module 9, instead of the status signal, at a desired timing. Accordingly, whether or not the semiconductor power module 9 is a desired power module can be easily recognized based on the identification signal. For example, the identification information indicated by the identification signal is displayed on the display device so that the operator can easily recognize whether or not the semiconductor power module 9 is a desired power module. Consequently, erroneous mounting of the power module can be more easily detected.

While the invention made by the present inventors has been described in detail above with reference to embodiments, the present invention is not limited to the embodiment described above and can be modified in various ways without departing from the scope of the invention. For example, in the semiconductor devices according to the embodiments described above, the conductivity type (p-type or n-type) of a semiconductor substrate, a semiconductor layer, a diffusion layer (diffusion region), and the like may be reversed. Accordingly, when one of the conductivity types of the n-type and the p-type is defined as a first conductivity type and the other conductivity type is defined as a second conductivity type, the first conductivity type may be the p-type and the second conductivity type may be the n-type. On the contrary, the first conductivity type may be the n-type and the second conductivity type may be the p-type.

The embodiments described above illustrate an example in which the signal that is output to the MCU 2 and switched from the identification signal by the switching unit 26 is the temperature signal indicating the temperature of the power module 3. However, the signal is not limited to the temperature signal, and any other status signal can be used as long as the signal is the status signal indicating the status of the power module 3. For example, the signal that is output to the MCU 2 and switched from the identification signal by the switching unit 26 may be a signal indicating a voltage or current to be supplied to the power module 3.

The embodiments described above illustrate an example in which the temperature of the power module 3 is detected in the semiconductor chip including the power element drive unit 10. However, the method for detecting the temperature of the power module 3 is not limited to this. The temperature of the power module 3 may be detected in the semiconductor chip including the power element 11. For example, a temperature detection diode may be incorporated in an active area of the power element 11 (for example, IGBT) or an FRD (Fast Recovery Diode) attached to the power element 11, and a monitor output of a VF (forward voltage) of the temperature detection diode may be input to the switching unit 26 as the temperature signal. According to this configuration, the MCU 2 can monitor a junction temperature Tj in real time based on the temperature signal. This is effective when the electric motor drive system 1 is applied to devices (for example, industrial devices) in which high-accuracy temperature monitoring is required.

The embodiments described above illustrate an example in which an analog value is output as the temperature signal from the power module 3 to the MCU 2, as shown in FIG. 2, based on the clock signal generated by the clock signal generation unit 27. However, the temperature signal is not limited to this. For example, a digital value may be output as the temperature signal from the power module 3 to the MCU 2. To be more specific, the MCU 2 according to the embodiments described above may include an A/D conversion circuit and obtain the temperature signal by converting the temperature signal from an analog value to a digital value by using the A/D conversion circuit.

The embodiments described above illustrate an example in which a combination of high and low signals (digital values) is output as the identification signal from the power module 3 to the MCU 2, as shown in FIG. 2, based on the clock signal generated by the clock signal generation unit 27. However, the identification signal is not limited to this. For example, an analog value may be output as the identification signal from the power module 3 to the MCU 2. Accordingly, in this case, the MCU 2 according to the embodiments described above may obtain the identification signal by converting the identification signal from an analog value to a digital value by using the A/D conversion circuit included in the MCU 2.

In the embodiments described above, when a voltage drop of the voltage supplied to the power module 3 is detected by the UVLO detection unit 22, or when an overcurrent state of the current supplied to the power module 3 is detected by the overcurrent detection unit 23, the FO signal generation unit 24 generates the FO signal indicating that the power module 3 is abnormal. However, any other fault may be detected. For example, the power element drive unit 10 may include a circuit for detecting, as a fault, a voltage drop of the voltage supplied to the MCU 2. This circuit determines whether or not the voltage supplied to the MCU 2 is equal to or greater than a predetermined voltage threshold, and outputs a signal indicating the determination result to the FO signal generation unit 24. When the circuit outputs the signal indicating that the voltage supplied to the MCU 2 is less than the predetermined voltage threshold, the FO signal generation unit 24 may generate the FO signal indicating that the power module 3 is abnormal.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor power module configured to drive an electric motor, the semiconductor power module comprising:
    a temperature signal generation unit configured to detect a temperature in the semiconductor power module, generate a signal indicating the detected temperature, and output the signal;
    an identification information storage unit configured to preliminarily store identification information for identifying the semiconductor power module, and output an identification signal indicating the identification information;
    a switching unit configured to select one of the signal output from the temperature signal generation unit and the identification signal output from the identification information storage unit, and output the selected signal outside of the semiconductor power module;
    a fault output signal generation unit configured to generate a fault output signal indicating whether or not the semiconductor power module is abnormal, and output the fault output signal to the outside of the semiconductor power module; and
    a rising edge detection unit configured to detect that the fault output signal output from the fault output signal generation unit is switched from a status indicating that the semiconductor power module is abnormal to a status indicating that the semiconductor power module is normal,
    wherein the switching unit selects the identification signal during a predetermined period after the semiconductor power module is restored to a normal operational state,
    wherein the rising edge detection unit outputs, to the switching unit, an indication signal indicating selection of the identification signal during a predetermined period after the detection that the fault output signal is switched from the status indicating that the semiconductor power module is abnormal to the status indicating that the semiconductor power module is normal, and
    wherein the switching unit selects the identification signal during a period in which the indication signal is output from the rising edge detection unit, the period being set as a predetermined period after the semiconductor power module is restored to the normal operational state.

2. The semiconductor power module according to claim 1, further comprising a rising edge detection unit configured to detect a request signal received from an external circuit after a lapse of a predetermined period as a period required for a voltage of the semiconductor power module to stabilize after power-on of the semiconductor power module, wherein
    the rising edge detection unit outputs, to the switching unit, an indication signal indicating selection of the identification signal during the predetermined period after the detection of the request signal from the external circuit, and
    the switching unit selects the identification signal during a period in which the indication signal is output from the detection unit, the period being set as the predetermined period after the semiconductor power module is restored to the normal operational state.

3. The semiconductor power module according to claim 1, further comprising an under voltage lock out unit configured to determine whether or not a voltage supplied to the semiconductor power module is less than a predetermined voltage threshold, the predetermined voltage threshold being set as a minimum voltage necessary for a normal operation of the semiconductor power module,
    wherein when the under voltage lock out unit determines that the voltage supplied to the semiconductor power module is equal to or greater than the voltage threshold, the fault output signal generation unit switches the fault output signal to the status indicating that the semiconductor power module is normal.

4. The semiconductor power module according to claim 1, further comprising an overcurrent detection unit configured to determine whether or not a current supplied to the semiconductor power module is equal or greater than a predetermined current threshold, a current equal to or greater than the predetermined current threshold being determined to be an overcurrent, and
    when the overcurrent detection unit determines that the current supplied to the semiconductor power module is less than the current threshold, the fault output signal generation unit switches the fault output signal to the status indicating that the semiconductor power module is normal.

5. A semiconductor power module comprising:
    a power element; and
    a control unit configured to control an operation of the power element,
    wherein the control unit includes:
        a detection terminal;
        a temperature signal generation unit configured to detect a temperature in the semiconductor power module and output a signal indicating the detected temperature;
        an identification information storage unit configured to store identification information and output an identification signal indicating the identification information; and
        a switching unit configured to select one of the signal and the identification signal and output the selected signal to an outside of the semiconductor power module via the detection terminal
    wherein the detection terminal is a first detection terminal, the control unit further includes:
        a second detection terminal; and
        a fault detection unit configured to output a fault detection signal outside via the second detection terminal, the fault detection signal indicating a fault state of the semiconductor power module, and the switching unit selects the identification signal according to a change of the fault detection signal and outputs the identification signal to the outside of the semiconductor power module via the first detection terminal, and then selects the signal indicating the detected temperature and outputs the signal indicating the detected temperature to the outside of the semiconductor power module via the first detection terminal.

6. The semiconductor power module according to claim 5, wherein during a predetermined period after the fault detection signal indicates a change from a fault state to a normal state, the switching unit selects the identification signal and outputs the identification signal from the first detection terminal.

7. The semiconductor power module according to claim 5, wherein after a lapse of a predetermined period required for an operation of the semiconductor power module to stabilize after a power supply voltage is supplied to the semiconductor power module, the switching unit selects the identification signal during a predetermined period and outputs the identification signal from the detection terminal.

8. A drive system for an electric motor, comprising:
   a semiconductor power module including a power element and a control unit configured to control the power element; and
   a power module control unit configured to control the semiconductor power module, wherein
   the control unit includes:
   first and second detection terminals;
   a fault detection unit configured to output a fault detection signal to the power module control unit via the first detection terminal, the fault detection signal indicating a fault state of the semiconductor power module;
   a temperature signal generation unit configured to detect a temperature in the semiconductor power module and output a signal indicating the detected temperature via the second detection terminal; and
   an identification information storage unit configured to store identification information and output an identification signal indicating the identification information; and
   a switching unit configured to select one of the signal indicating the temperature and the identification signal according to the fault detection signal, and supply the selected signal to the power module control unit via the second detection terminal, and
      during a predetermined period after the fault detection signal detects that the semiconductor power module is in a normal state, the power module control unit acquires a signal output from the second detection terminal as the identification signal, and after the predetermined period, the power module control unit acquires the signal indicating the detected temperature.

* * * * *